US005829052A

United States Patent [19]
Pawlowski et al.

[11] Patent Number: 5,829,052
[45] Date of Patent: Oct. 27, 1998

[54] METHOD AND APPARATUS FOR MANAGING MEMORY ACCESSES IN A MULTIPLE MULTIPROCESSOR CLUSTER SYSTEM

[75] Inventors: Stephen Pawlowski, Beaverton; Tom Holman, Portland, both of Oreg.

[73] Assignee: Intel Corporation, Santa Clara, Calif.

[21] Appl. No.: 762,996

[22] Filed: Dec. 10, 1996

Related U.S. Application Data

[63] Continuation of Ser. No. 367,443, Dec. 28, 1994, abandoned.

[51] Int. Cl.[6] .............................. G06F 12/00; G06F 13/00
[52] U.S. Cl. .................................... 711/147; 364/DIG. 1; 364/230; 364/238.4; 395/200.01; 395/728; 711/130; 711/145; 711/147; 711/148; 711/154; 711/205
[58] Field of Search ........................ 395/474, 457, 395/472, 200.01, 200.02, 200.07, 200.08, 200.09, 20.12, 481, 728; 364/DIG. 1, 238.4, 230; 711/130, 145, 147, 148, 154, 205

[56] References Cited

U.S. PATENT DOCUMENTS

| | | | |
|---|---|---|---|
| 4,663,706 | 5/1987 | Allen et al. | 395/200.13 |
| 4,939,636 | 7/1990 | Nakagawa et al. | 395/474 |
| 5,185,875 | 2/1993 | Chinnaswamy et al. | |
| 5,201,040 | 4/1993 | Wada et al. | 395/474 |
| 5,241,664 | 8/1993 | Ohba et al. | 395/474 |
| 5,293,602 | 3/1994 | Fukagawa et al. | 395/474 |
| 5,327,548 | 7/1994 | Hardell, Jr. et al. | 395/474 |
| 5,363,498 | 11/1994 | Sakuraba et al. | 395/474 |
| 5,437,017 | 7/1995 | Moore | 395/400 |
| 5,442,758 | 8/1995 | Slingwine et al. | 395/375 |
| 5,463,754 | 10/1995 | Beausoleil et al. | 395/200.08 |
| 5,485,593 | 1/1996 | Baker | 395/200.08 |

OTHER PUBLICATIONS

"The Metaflow Architecture", IEEE Micro., by Val Popescu, Merle Schultz, John Spracklen, Gary Gibson, Bruce Lightner and David Isaman, 1991 pp. 10–13 & pp. 63–73.

*Primary Examiner*—Tod R. Swann
*Assistant Examiner*—Tuan V. Thai
*Attorney, Agent, or Firm*—Blakely, Sokoloff, Taylor & Zafman

[57] ABSTRACT

A cluster controller for controlling access to local memory and remote data cache in a multiple cluster computer system. In a multiple cluster computer system, a local memory in a cluster is part of the overall system address space. In order to manage local access as well as remote access to the local memory, the cluster controller maintains the responsibility of arbitrating the access to memory. Likewise, data from remote memory stored in the remote data cache is controlled by the cluster controller.

8 Claims, 3 Drawing Sheets

| TPI | TPO | ACTION |
|---|---|---|
| 0 | 0 | COMPLETE OPERATION AS REQUESTED |
| 0 | 1 | (INTERNAL) ABORT OPERATION/ GENERATE NO RESPONSE |
| 1 | 0 | SEND RETRY RESPONSE |
| 1 | 1 | SEND DEFER RESPONSE |

METHOD AND APPARATUS FOR MANAGING MEMORY ACCESSES IN A MULTIPLE MULTIPROCESSOR CLUSTER SYSTEM

This is a continuation of application Ser. No. 08/367,443, filed Dec. 28, 1994, now abandoned.

BACKGROUND OF THE INVENTION

1. Field of the Invention

The present invention relates to the field of microprocessors and, more particularly, to multiple processor cluster systems.

2. Prior Art

The use of a microprocessor in a computer system is well known. Generally, a processor is coupled to a bus for transfer of information to and from memory. A memory controller is employed in controlling the access to memory. In most systems, a data cache is used to hold data currently being used in order to speed the access of this data. Input/Output devices are usually coupled to the bus, often times by the use of "slots" on the bus. In more sophisticated systems, more complex memory management schemes are utilized as well as a hierarchical bus structure with more than one bus.

As technology evolves, there is higher demand for multiple-processor systems to increase the processing power. Hence, computer systems employing multiple processors are more prevalent today. Parallel computing is becoming a common place technology. One way to utilize parallel computing is to place a plurality of processors on a bus and share resources allocated on a bus. Arbitration of access to common resources now require additional constraints.

However, as technology progresses further, an enhanced application is to implement a system having a plurality of these multiple processor system. That is, the multiple processor configuration of above is each configured as an independent processor cluster and a number of these clusters are combined into an integrated computer system. As long as each cluster confines its operations to within its own cluster, the complexities are not significantly advanced. However, if each cluster is provided the capability to access resources in other clusters, data arbitration and management are complicated significantly.

The present invention provides for one scheme to control local cluster memory access when such memory is accessible to resources from other clusters. Additionally, data from remote memory are stored in a remote data cache and controlled by the scheme of the present invention.

SUMMARY OF THE INVENTION

The present invention describes a cluster controller for memory and data cache in a multiple cluster system. A multiple-processor cluster includes its own memory, as well as a remote data cache. The cluster operates in a system where there are multiple clusters. In a flexible system, the memory is part of the overall system address space in which resources outside of the cluster can access the local memory. The cluster controller provides arbitration and management of the memory access in order to prevent any conflict and to maintain a coherent system memory image.

The cluster controller of the present invention maintains a look-up table of local memory locations accessed by remote resources. Thus, remote access to local memory are controlled to prevent any remote conflicts. The cluster controller also uses this table to determine if a memory location has been "borrowed" (presently in use) by a remote resource when local access is attempted. Signal lines from the cluster controller to the local memory controller provide the necessary control signals.

Likewise, similar control signals are used to control accesses to the remote data cache. When a cluster accesses remote memory locations, the data in those locations are placed into the cluster's remote data cache. Accordingly, the cluster controller keeps track of the address location(s) of the remote data that is stored in the remote data cache and allow local access to the data cache only when proper data is present.

In the preferred embodiment, TAG memories are used for providing a look-up table for memory access and remote data cache access. Essentially, the present invention provides for a scheme to permit and control remote access to and from local cluster memory.

ECONOMIC ADVANTAGE

By providing for a scheme to permit remote access to a processor cluster, memory mapping for a multiple processor system is enhanced. This permits improved processing and more enhanced information transfer. Processing more information per unit time has significant economic advantage.

DETAILED DESCRIPTION OF THE PREFERRED EMBODIMENT

A cluster controller for memory and data cache in a multiple cluster system is described. In the following description, numerous specific details are set forth, such as a specific structure for processors, memories, controllers, bus architecture, etc., in order to provide a thorough understanding of the present invention. However, it will be obvious to one skilled in the art that the present invention may be practiced without these specific details. In other instances, well known techniques and structures have not been described in detail in order not to unnecessarily obscure the present invention. It is to be noted that a preferred embodiment of the present invention is described, however, it is readily understood that other embodiments can be designed and implemented without departing from the spirit and scope of the present invention.

Figure 1:
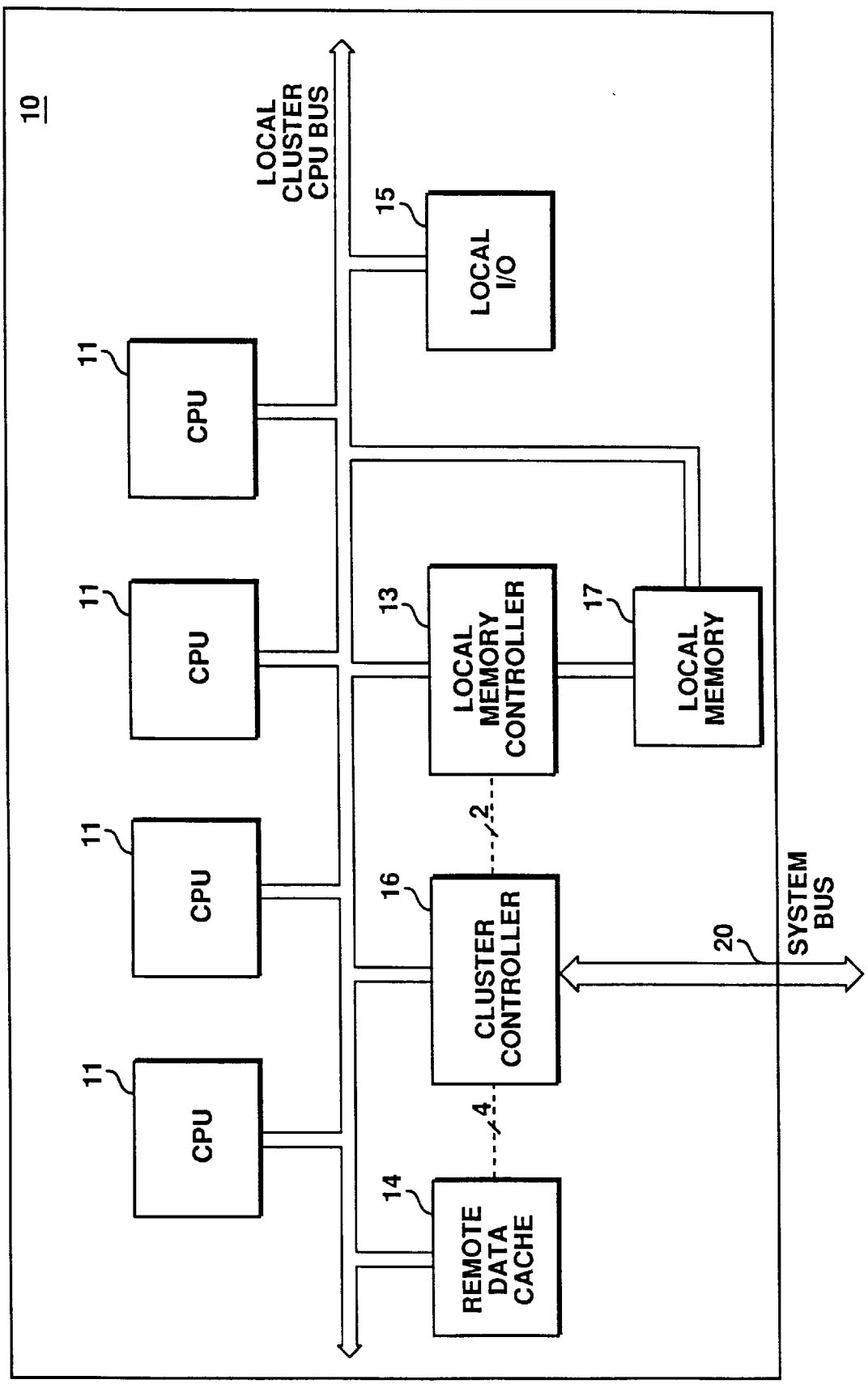
FIG. 1 is a block schematic diagram of a processor cluster in which accesses to and from the cluster are controlled by a cluster controller of the present invention.

Referring to FIG. 1, a diagram of a processor cluster 10 is shown in which several processors (identified as CPUs) 11 reside within cluster 10. Only four CPUs 11 are shown, but the actual number is a design choice. Additionally, the cluster 10 can be made to operate with a single processor 11. The CPUs 11 are coupled to a local cluster bus 12. A local memory 17 is coupled to bus 12 and controlled through local memory controller 13. Also coupled to bus 12 are a remote data cache 14, local I/O (input/output) 15 and a cluster controller 16. Cluster 10 is a basic computer system operating in a multi-processor environment. It is to be noted that other devices can be readily included within cluster 10, but are not necessary or critical to the understanding of the present invention.

Figure 2:
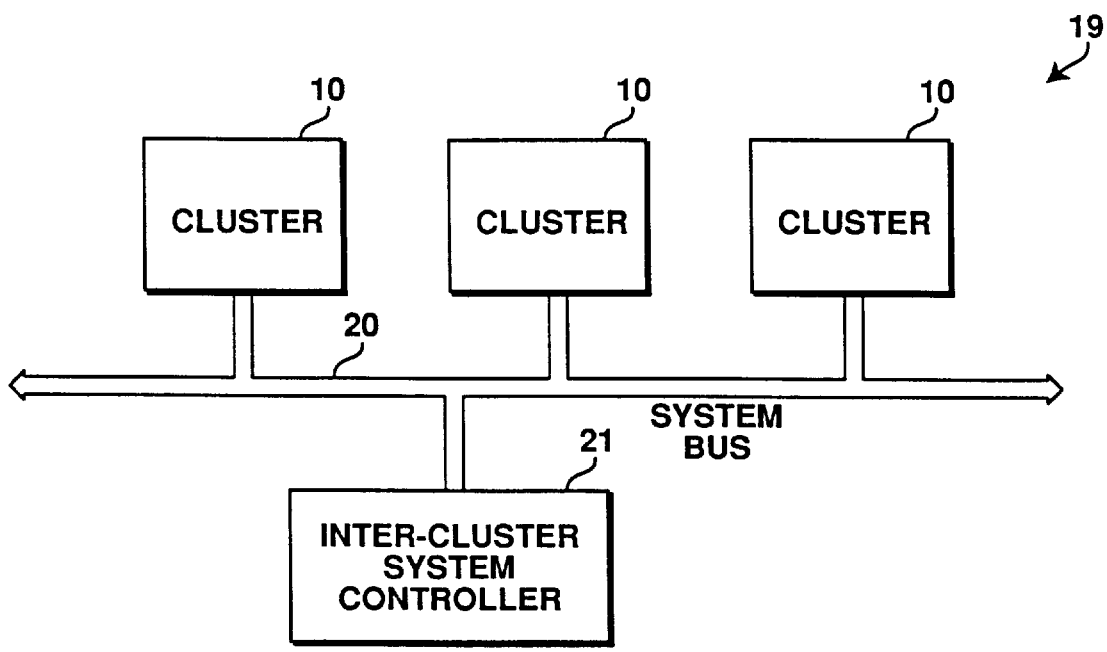
FIG. 2 is a block schematic diagram of a computer system utilizing a number of clusters described in FIG. 1.

Cluster 10 can operate individually, but in the context of understanding the present invention, it is assumed that a plurality of clusters are employed, as shown in FIG. 2. A plurality of clusters 10 are employed in a processor system 19, the actual number being a design choice. The clusters 10 are coupled together by an inter-cluster system bus 20, which bus is also coupled to an inter-cluster system controller 21. The inter-cluster system controller 21 is responsible for the arbitration of bus 20 by the clusters 10. It is appreciated that the system controller 21 includes additional functions such as I/O interrupt collection and distribution, global initialization logic, system diagnostic logic, as well as other functions, which are needed for overall system 19 control, but are not critical to the understanding of the present invention. It is to be emphasized that each cluster 10 is capable of operating independently of any other cluster, although they operate together within system 19.

As is noted in FIG. 1, each cluster is coupled to the system bus 20 by the cluster controller 16. It is one of the tasks of cluster controller 16 to provide the bridge between bus 12 and bus 20 and arbitrate for local access by devices outside of the particular cluster. It is to be appreciated that in the overall system, each cluster is also referred to as a "node" and cluster devices are agents or resources on this node. Furthermore, the term "local" is used to refer to a cluster containing a device under discussion. The term "remote" is used to indicate resources outside of the particular cluster under discussion. Typically, the remote resource is in another cluster.

The local memory 17 of a cluster 10 is a memory resource that has been specifically assigned to this node (cluster). The local memory 17 may be part of the entire address space of the system 19 or it may be a local resident memory only. If it is only a local resident memory, the information stored in this memory is accessible only by devices on the local node. The local memory controller 13 operates to control the local access of memory 17. However, it is more likely that the memory 17 is part of the system 19 address space, so that some or all of the memory 17 is "visible" to other resources within system 19 and accessible by devices on other nodes. In this mode of operation, cluster controller 16 will need to operate on local CPU 11 accesses to memory 17 in addition to the local memory controller 13.

When a resource outside of the local cluster has a copy of a location in the local memory 17, local access to that location in memory 17 cannot be permitted. The cluster controller 16 will need to maintain a directory of which local memory locations are owned by a remote resource as opposed to those owned by a local resource. Essentially, if local memory locations are "borrowed" (accessed) by another cluster(s), the cluster controller 16 is responsible for maintaining a table of such locations of local memory 17 which have been "borrowed" by external clusters in order to maintain a coherent system memory image.

For example, when a local CPU 11 makes a request for local memory 17, the cluster controller 16 must check its memory access table to determine if the requested location has been "borrowed" by a remote cluster. If the requested memory location has not been borrowed by a remote cluster, the cluster controller 16 will permit the local memory controller 13 to allow the access pursuant to protocols established for local access within the cluster. However, if the memory location has been "borrowed" by another cluster, the cluster controller 16 will not permit the access. The local memory controller 13 must abort, defer or cause a "retry" of the transaction, depending on the protocols established by the system architecture.

It is important to note that the local memory controller 13 is the responding agent for a transaction directed to it regardless of the outcome of the attempted access. It is the cluster controller 16 which must communicate to the local memory controller 13 as to the outcome of the access check so that the appropriate command response can be delivered by the local memory controller 13.

Although there are many ways to communicate such controls to the local memory controller 13, the preferred embodiment utilizes two hardwired lines from cluster controller 16 to the local memory controller 13, as shown in FIG. 1. The two signals are noted as TP0 and TP1. The bit values of TP0 and TP1 and the resulting action are noted in the table shown in FIG. 3. The actions for the preferred embodiment are complete operation, retry, defer and no response. It is to be noted that such actions, other than permitting the access, are determined by the protocol of the system, which is a design choice.

Alternatively, if a memory access is from a remote cluster, then cluster controller 16 operates as a bridge between the system bus 20 and its cluster. Cluster controller 16 will allow the transaction, if after checking the access table no other remote cluster has "borrowed" the memory location. Cluster controller 16 will then operate as an agent on the local node to vie for access from local memory controller 13 for the memory location. The access table in the cluster controller 16 is updated to reflect the access of the memory location by a remote resource.

It should be noted that it is possible that the addressed element is borrowed from another cluster. In such instance, the operation becomes a bit more complex. For example, if cluster A requests data from a second cluster B, which in turn has transferred temporary ownership of the data element to a third cluster C, two alternatives are possible. In the first alternative response, cluster B cancels (retries) the request from cluster A, then obtains the data from cluster C and waits to deliver the data on a retry request from cluster A. In the second alternative, cluster C invalidates its copy of the data from cluster B on the request from cluster A and delivers that data to cluster A in response to the request. Cluster B observes the bus during this time period and when the data transfer occurs, cluster B will update the information in its access table to reflect that cluster A has assumed ownership of the data element.

The data cache 14 is controlled in much the same way as memory 17. That is, the cluster controller 16 maintains access control of information in data cache 14. Although the data cache 14 can be utilized for caching local data, in the preferred embodiment data cache 14 is utilized for caching remote data. Thus, when a local agent, such as one of the CPUs 11, issues a memory request, the data cache 14 begins to operate on that request. In parallel with this operation, the cluster controller 16 will perform a look up to determine the location of the request. If the location is remote to the cluster, the cluster controller 16 will also look to determine if the contents of that remote location are currently resident in the data cache 14. The results from the cluster controller 16 are conveyed to the data cache 14.

Figures 3, 4:
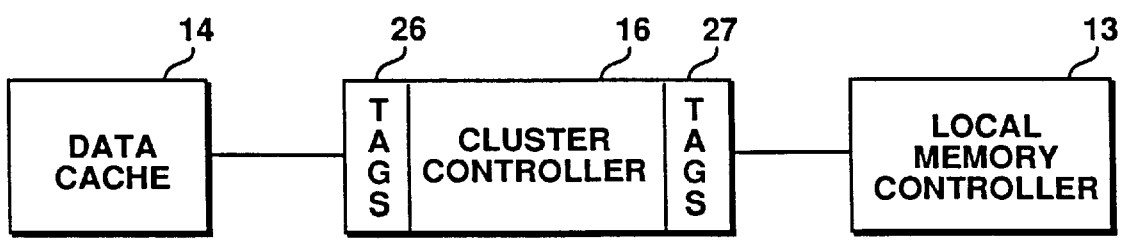
FIG. 3 is a table showing signal values and their initiated actions by the cluster controller for controlling accesses to local memory and remote data cache.
FIG. 4 is a block diagram showing the use of TAG memories in the cluster controller to control access to the local memory and data cache.

The results of the access request by the local agent are as follows. If the request is to a local memory resource, the request to the data cache is terminated, since the data cache 14 is being utilized for remote data only. If the request is to a remote location that is currently cached in the data cache 14, the transaction is permitted. If the request is to a remote location that is not currently cached in the data cache 14, the request to the data cache 14 under direction of the cluster controller 16 will need to respond with a defer or retry to the agent requesting it. The fact that a particular location is a remote location and whether that remote location is cached is the responsibility of the cluster controller 16. Again, TP0 and TP1, signals with their actions noted in FIG. 3 are hardwired to the data cache 14 to provide the noted actions. As noted earlier, the actions are determined by the system protocol and such a protocol is a design choice.

In the event the data corresponding to the remote location is not currently cached in data cache 14, the cluster controller 16 will need to access the data at the remote location and provide the data to the local cluster. When the requested data is retrieved, the data cache 14 is updated, as well as the access tables of cluster controller 16. Thus, caching of remote locations is available locally in data cache 14.

It is appreciated from the above description that the cluster controller 16 operates as a data cache controller as well as a cluster controller for bridging information between its cluster and the rest of the system. As a cache controller, the cluster controller 16 controls data accesses from the data cache 14. As a controller of the local cluster, the cluster controller 16 controls requests from local resources to remote resources and maintains consistency of local data that may be cached in remote nodes (that is, remote access of local memory). As a bridge, the cluster controller 16 will control remote accesses to the local cluster 10, such that requests from remote resources are initiated locally by the cluster controller 16. However, a critical aspect of the cluster controller 16 is its ability to intercede requests on behalf of local memory 17 or data cache 14 when the request is from a local resource. TAGs are utilized to provide the access control within cluster controller 16.

Referring to FIG. 4, TAGs, which are integral to the operation of the cluster controller 16, are shown. Data cache TAG memory 26 used to store the TAG contents of any remote resources that are cached locally in the cluster. A remote directory memory 27 is utilized to store the TAG contents of any local resources that are owned by remote resources. Note that other local resources (other than local memory 17) not shown in FIG. 1 may be designed to be accessed by remote resources. The remote directory will maintain records of these "borrowed" locations as well. Thus, the TAG contents of data cache TAG memory 26 and remote directory memory 27 operate as the look up or access table earlier described.

It is to be noted that location information for remote access will be included in the cluster controller. One technique is that a portion of the TAG contents, not directly related to the address ID (identification), include the cluster ID of the remote cluster owner. An alternative technique is that there be a separate smaller cache, referenced by the TAG, include the cluster ID and any other relevant system information, such as cache state in the remote node. This second approach is desirable if the earlier described TAG is not to be burdened by this additional information.

As shown in FIG. 1, there are four control lines from the cluster controller 16 to data cache 14. Two of the lines are for signals TP0 and TP1. The other two hardwired lines are for implementing a 4-way set associative data cache for data cache 14. The signals are derived from lower order address bits of a request to select which location, within a set, the requested data elements resides. However, it is to be noted that such set associative cache, though desirable, is not critical to the practice of the present invention.

Finally, it is to be appreciated that the cluster controller 16 will need to provide an additional function as a bridge unit when responding to a transaction when it is deferred. The cluster controller 16 will need to be responsible for the subsequent deferred transaction. The deferred response was generated because the memory element requested is owned by another cluster. When this element is returned, the cluster controller 16 must update the memory controller 13 and memory 17 with the correct data. To achieve this, the cluster controller 16 must perform separate write transaction to update memory 17.

If the deferred transaction was a read transaction, the "write" to memory is simply the data received from the remote cluster. The deferred transaction can now be completed. If the deferred transaction was a write transaction, the cluster controller 16 must maintain the original deferred write data, merge that data with the incoming data relinquished from a remote cluster (typically, data cache in a remote cluster) and "write" the new data element back into memory. It is appreciated that equivalent deferred transactions as described above in reference to the memory 17 can be readily implemented with data cache 14.

Finally, it is to be appreciated that there are numerous implementations available for providing the control resources of the cluster controller 16 of the present invention. Such implementations in hardware and software can be obtained by the practice known in the prior art.

Thus, a cluster controller for memory and data cache in a multiple cluster system is described.

We claim:

1. In a multiple-cluster computer system in which a cluster includes a processor and a local memory and wherein said local memory is part of a system address space of said computer system, such that said local memory is accessible by said processor and by resources remote to said cluster, an apparatus for controlling accesses to said local memory comprising:

a local memory controller coupled to said processor and to said local memory and being configured to control accesses to said local memory by said processor;

a cluster controller coupled to said local memory controller and to said resources remote to said cluster and being configured to control accesses to said local memory by said resources;

said cluster controller including a look-up table of local memory locations which can be accessed by said remote resources, said look-up table including a portion which stores address tags associated with said local memory locations access by a remote resource to a first location in said local memory being permitted when said first location is not being accessed by another remote resource;

said cluster controller being further configured to arbitrate for access to said local memory from said local memory controller in response to an access request by said remote resource;

said cluster controller also being configured to control access to said local memory by said processor via said local memory controller, wherein an attempted access by said processor to a location in said local memory is permitted when said location is not being accessed by one of said remote resources;

a data cache which contains data accessed from locations remote to said cluster for use by said processor, wherein said cluster controller is further configured to obtain data from remote locations when requested by said processor and to retain address of said remote locations of data stored in said data cache, such that data from remote location are stored in said data cache for use by said processor.

2. The apparatus of claim 1 wherein addresses of remote locations of data stored in said data cache are retained in a separate look-up table.

3. The apparatus of claim 2 wherein said data cache comprises a 4-way set associative cache.

4. The apparatus of claim 1 wherein said local cluster comprises a plurality of processors, each of said processors being to said local memory and to said data cache.

5. In a multiple-cluster computer system in which a cluster includes a processor and a local memory and wherein said local memory is part of a system address space of said computer system, such that said local memory is accessible by said processor and by resources remote to said cluster, a method of controlling accesses to said local memory, comprising the steps of:

receiving, by a cluster controller associated with said cluster, an access request to a memory location from a resource remote to said cluster, said cluster controller having a look-up table which includes address tags associated with locations of said local memory previously accessed by said resources remote to said cluster;

consulting said look-up table to determine whether said memory location has been accessed by said resource;

denying said access request if said memory location has been previously accessed by said resource otherwise, arbitrating for access to said local memory by said resource via a memory controller coupled to said local memory;

controlling access of said local memory by said processor by utilizing said look-up table in said cluster controller, wherein an access by said processor to a certain memory location in said local memory is first checked by said cluster controller and said cluster controller permits said local memory controller to allow said access only when said certain memory location is not being accessed by one of said resources remote to said cluster, such that access conflicts to said local memory by said processor and said resources remote to said cluster are controlled;

permitting, by said cluster controller an access by said processor to a certain memory location in said local memory when said certain memory location is not accessed by one of said resources.

6. The method of claim 5 wherein said cluster further comprises a data cache, and further comprising the steps of:

obtaining data by said cluster controller from locations remote to said cluster in response to a request from said processor;

storing said data in said data cache; and retaining addresses, in said cluster controller, of said locations remote to said cluster from which said data was obtained.

7. The method of claim 6 wherein said cluster controller further comprises a separate look-up table which retains said addresses of said locations remote to said cluster.

8. The method of claim 5 wherein said local cluster further comprises a plurality of processors, each of which is coupled to said local memory.

* * * * *